Jan. 29, 1963  J. S. HALSTEAD  3,075,730
RESILIENT FAIRING STRIP FOR USE IN CONNECTION WITH
RESILIENT LANDING GEARS OF AIRCRAFT AND THE LIKE
Filed April 8, 1960
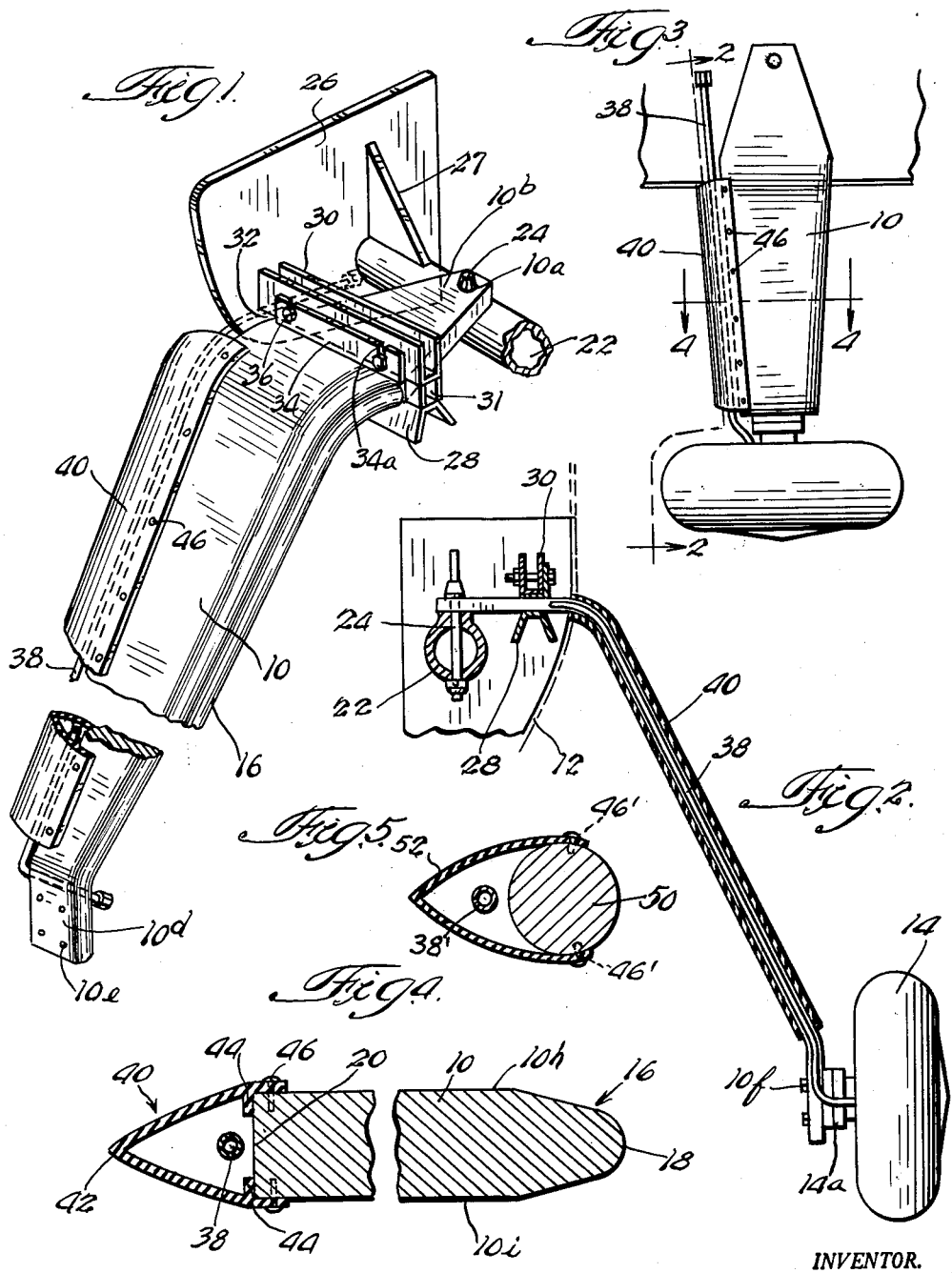
INVENTOR.
John S. Halstead.
BY 3,075,730
Patented Jan. 29, 1963

1

3,075,730
RESILIENT FAIRING STRIP FOR USE IN CONNECTION WITH RESILIENT LANDING GEARS OF AIRCRAFT AND THE LIKE
John S. Halstead, 14500 Park Ave., Dolton, Ill.
Filed Apr. 8, 1960, Ser. No. 20,892
2 Claims. (Cl. 244—104)

This invention relates to a resilient fairing strip for use in connection with resilient landing gears of aircraft and the like.

One of the objects of this invention is to provide an improved fairing strip formed of resilient and flexible material which is readily attachable to resilient landing struts of the character shown and described in the Salter Patent No. 2,597,265, or other resilient landing gear struts.

The Salter patent shows and describes a landing gear for light and medium weight planes, employing a resilient strut in which the lead and the trail edges of the strut are each provided with a longitudinally extending groove or channel serving to support therewithin the tubing for the hydraulic braking system. Said patent also shows a metal fairing strip adapted to be snapped into position on the front and rear edges of the strut.

With the present invention the tubing for the hydraulic braking line is positioned exteriorly of the edges of the resilient landing gear or strut and spaced therefrom but within the resilient and flexible fairing strip which is secured to the strut. With applicant's structure the resiliency of the landing gear or strut is not impaired and the tubing for the brake line will not crack or break and the connections will not loosen, which if they occurred would have obvious disastrous results.

Another object of this invention is to provide a highly resilient and flexible fairing strip for the landing gear of an airplane which will flex with the landing gear and will not impair or interfere with the resiliency thereof, and which will provide an encasement for the tubing of the braking line.

The necessity of providing channels or grooves in the struts of the Salter construction also increased the production costs of the strut and reduced its strength. This is likewise obviated with applicant's construction.

Other objects will become apparent as this description progresses.

In the drawings:

FIGURE 1 is a view of a portion of the landing gear of a plane utilizing a resilient strut and showing my invention applied thereto.

FIGURE 2 is an elevational view, partly in section, showing the fairing strip and the tubing therewithin.

FIGURE 3 is a plan view of the strut and wheel of FIGURE 2, with the supporting elements removed and showing the flexible fairing strip attached to the strut.

FIGURE 4 is a cross-sectional view taken on lines 4—4 of FIGURE 3, showing the strut, the flexible fairing strip attached to the rear of the strut, and the tubing positioned within the fairing strip, and FIGURE 5 is a cross-sectional view of a modification which would be taken of the modification on lines corresponding to that of FIGURE 4.

While the drawings and description herein are directed to a strut generally of the type shown in the Salter Patent No. 2,597,265, it will be understood that this invention may be used with any other type of landing gear employing a resilient strut.

The strut 10 is essentially a single leaf spring which is formed from a tapered strip of uniform thickness, preferably of chrome vanadium steel, and is heat treated to give it maximum toughness and resistance against fatigue. The spring leaf strut is provided at its upper inner end with a single hole 10a by which it is anchored to the structure at its flat upper terminal portion 10b.

The main spring portion of the strut 10 comprises the elongated tapered portion 10b which is reduced gradually in width from its maximum, when it passes through the fuselage skin 12, to its minimum width at the outer lower terminal where it meets the downwardly bent portion 10d. The upper terminal portion 10b tapers in width more rapidly from the greatest width in the region of the skin 12 to its inner terminal adjacent opening 10a.

The outer lower terminal 10d is provided with a plurality of bolt holes 10e adapted to receive the bolts 10f, by means of which the wheel 14 and its axle assembly 14a are attached to the strut terminal. While the rotatable wheels are shown, it is understood that it may be used with skids, skis, and other ground engaging means.

The lead edge 16 of the strut 10 is curved or rounded as at 18, best seen in FIGURE 4. The rear or trail edge 20 of the strut 10 is generally straight or perpendicular to the horizontal plane of the strut.

The fuselage is provided with a tubular member 22 which has a suitable opening to accommodate a bolt 24 which extends through opening 10a to secure the strut 10 thereto. Transverse bulkheads or diaphragms 26 are longitudinally spaced fore and aft of the point of attachment, only one of the bulkheads 9 being shown in FIGURES 1 and 2. The tubular element 22 is preferably welded or otherwise fixedly attached to the transverse bulkheads 26 and is preferably also provided with gusset plates 27 which may also be welded to both the tube 22 and the bulkhead plates 26.

With the strut 10 fixed and in assembled position, as best shown in FIGURE 1, its upper horizontal portion 10b will be positioned so that the single bolt hole 10a will be alined with the opening through the upper and lower walls of the tubular member 22 in order to receive the bolt 24 provided with suitable washers and locking nuts.

There is also fixedly carried between the transverse bulkheads 26 a pair of longitudinally disposed channels 28 and 30, arranged in back to back relationship, but having spacing blocks 31 and 32 disposed between their adjacent vertically spaced webs. The channels 28 and 30 are preferably welded at their fore and aft ends to the transverse bulkheads 26, and the spacer blocks 31 and 32 are also welded or otherwise attached between the channel webs in such manner that they are spaced apart a distance which is slightly greater than the thickness of the spring leaf comprising a strut 10. The spacer blocks 31 and 32 are also spaced so that the upper portion 10b of the strut 10 may be slidingly received therebetween.

An angle shaped wedge 34 has its vertical leg suitably slotted as at 34a to aline with suitable bolt holes which are provided through the upstanding flanges of the upper channel 30. The angle wedge 34 fits between the spaces 28 and 30 and is secured by bolt 36.

While the Salter Patent No. 2,597,265 shows the lead and trail edges of the strut as being grooved so that they can accommodate a tubing for the transmission of fluid under pressure for the braking system, applicant, though very familiar with lightweight planes employing flexible and resilient struts, has not seen any airplane utilizing grooves or channels within the strut for accommodating the tubing. In fact, light planes utilizing the flexible strut support the tubing in an exposed position, rearwardly of the rear edge of the strut and in spaced relation to the rear edge of the strut, consequently, the exposed tubing is subject to all of the hazards attendant exposed tubing. This can have serious consequences.

The tubing for the transmission of fluid under pressure in the braking system is indicated by the numeral 38 and is positioned rearwardly of the rear edge 20 of the strut 10. It is, however, within the plane of the opposite sides or surfaces 10h and 10i of the strut.

Applicant's fairing strip, generally indicated by the numeral 40, is an elongated strip made of a flexible material, such as rubber or the like, which is highly resilient and yields with the flexing of the strut 10. It is readily attachable to the trailing edge of the strut 10.

The cross-section of the fairing strip is best shown in FIGURE 4 of the drawing and comprises an elongated strip, tapering to a substantial sharp feather edge 42. The interior of the fairing strip is hollow and is provided with inwardly directed lips 44 extending longitudinally of the length of the strip, which are adapted to be positioned against the vertical edge 20 of the trailing edge of the strut and serve to limit the positioning of said fairing strip on said strut.

The fairing strip has a portion extending rearwardly over the upper and lower edges of the strut, and said fairing strip is secured in any well-known manner. As shown in the drawing, same is secured by means of attaching pins or rivets 46 passing through openings in said fairing strip and same are suitably spaced, as best shown in FIGURE 1. The fairing strip may also be secured by glue or the like.

Applicant's fairing strip, which is formed of rubber or other flexible material, may be readily applied and secured over the trailing edge of the strut and when so secured encloses the normally exposed tubing 38 of the fluid brake system. Applicant's fairing strip is of such flexibility that it will "give" with the "give" of the strut and not interfere with the flexibility of the strut.

FIGURE 5 is a modification showing another form of strut used in landing gears with the fairing strip of this invention applied thereto. The strut in this modification is round or circular in section, as indicated by the numeral 50. The brake line 38' is positioned rearwardly of the strut. The fairing strip indicated by the numeral 52 has the configuration shown and is generally like the fairing strip 40, except that it does not have the inwardly directed lips like lips 44. The fairing strip 52 is secured to the struts by rivets 46', or it may be secured by any well-known fastening means.

In the structure of the Salter Patent No. 2,597,265, the fairing strip shown therein was apparently made of metal and was snapped into the channel or groove of the trail edge. This type of fairing strip will not "give" and it would therefore impede the resiliency of the strut.

In applicant's construction there are no grooves in the trailing edge of the strut and the tubing is positioned exteriorly and laterally thereof so that the resiliency and flexing of the strut is not interfered with, nor is the strut weakened by longitudinal grooves in the strut.

It will thus be seen that with applicant's construction the advantages of the flexible strut are still obtainable. In addition, applicant's fairing strip is used to enclose and encase the tubing of the braking system while the tubing is positioned exteriorly of the strut. Applicant's construction will reduce drag and increase the efficiency of the ship.

It will be understood that various changes and modifications may be made from the foregoing without departing from the spirit and scope of the appended claims.

I claim:
1. In an aircraft landing gear including a strut of resilient material to resiliently absorb landing and taxiing loads, a ground engaging element operatively attached to the outer portion of said strut, conduit means positioned adjacent the longitudinal edge of said strut and spaced from said longitudinal edge for the control of said ground engaging element, a resilient fairing strip secured to the strut along the aforementioned longitudinal edge to enclose the conduit means within the outline of the opposite sides of the strut and assist in reducing the resistance to the airstream, said fairing strip being supported by the strut and adapted to flex along its length with the flexing of the strut, said fairing strip comprising a closed outer edge of generally V-shaped formation and an open inner edge, said open inner edge having its opposite spaced walls engaging the strut with the strut closing said open inner edge of said strip, and means for securing the opposite spaced walls to said strut.

2. In a structure defined in claim 1 in which the fairing strip is made of rubber.

References Cited in the file of this patent
UNITED STATES PATENTS

| | | |
|---|---|---|
| 1,333,620 | Kemp | Mar. 16, 1920 |
| 1,852,129 | Ronan | Apr. 5, 1932 |
| 1,944,436 | King | Jan. 23, 1934 |
| 2,306,269 | King | Dec. 22, 1942 |
| 2,355,026 | Koppen | Aug. 1, 1944 |
| 2,597,265 | Salter | May 20, 1952 |